Patented July 11, 1950

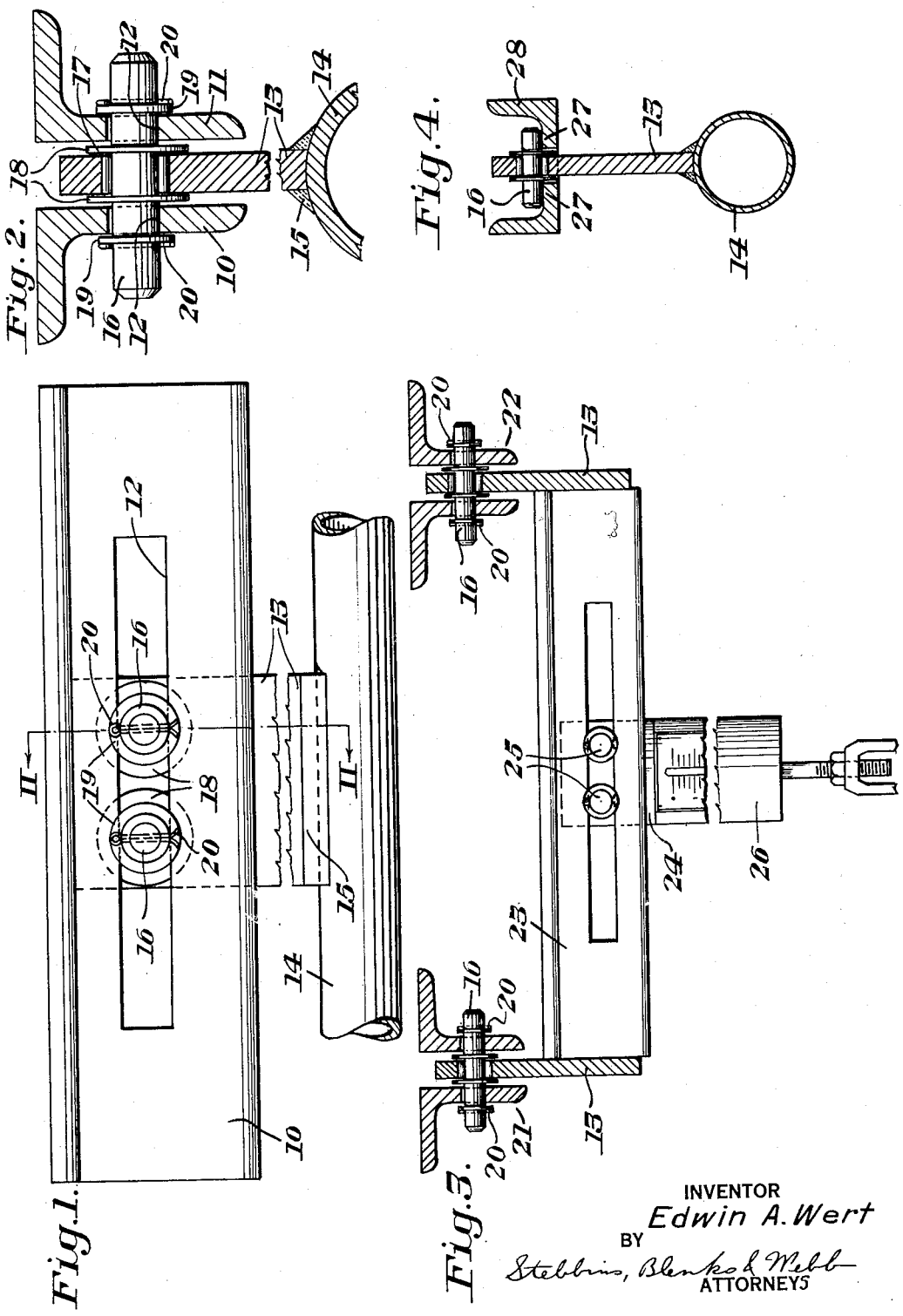

2,515,028

UNITED STATES PATENT OFFICE 2,515,028

TROLLEY FOR PIPE HANGERS

Edwin A. Wert, Pittsburgh, Pa., assignor to Blaw-Knox Company, Pittsburgh, Pa., a corporation of New Jersey Application October 17, 1945, Serial No. 622,849

5 Claims. (Cl. 248—58)

This invention relates to a suspension mechanism particularly adapted for pipe or the like in installations where it is desirable to allow the suspended member limited freedom of movement in one or more directions, to compensate for thermal expansion and contraction, for example.

The object of my invention is to provide a simple, rugged mechanism which can be manufactured at low cost and is of compact construction, requiring a minimum of head room. In a preferred embodiment, the invention comprises a hanger plate depending between spaced parallel track members and adapted to be secured to the member to be supported by welding or otherwise. Shafts extend through the plate at points spaced along the track members and their ends rest on the latter for rolling movement thereon. About each shaft and bearing thereon and also against the bores through the plate I provide a cluster of small anti-friction rollers. I provide means between the plate and the beams for retaining the rollers in place and centering the shafts longitudinally.

For a complete understanding of the invention, reference is made to the accompanying drawings illustrating the preferred embodiment. In the drawings, Figure 1 is a side elevation;

Figure 2 is a transverse section taken along the plane of line II—II of Figure 1;

Figure 3 is a view partly in section and partly in elevation showing the trolley mechanism arranged to provide freedom of movement in two directions; and Figure 4 is a view similar to Figure 2 showing a modified construction.

Referring in detail to the drawings, spaced parallel beams 10 and 11 have track surfaces 12 formed thereon. In the embodiment illustrated in Figure 1, the track surfaces are formed by machining slots in the vertical flanges of the angles which constitute the beams. It will be understood, of course, that the beams may be of any type of section desired.

A hanger in the form of a plate 13 is disposed between the beams 10 and 11 and is adapted to be secured to the member to be supported such as a pipe 14. As shown in the drawings, the plate is welded at 15 to the pipe but other methods of securing it may be employed. Shafts 16 extend through holes in the plate 13 spaced along the track surfaces 12 and the ends of the shafts are adapted to roll on these surfaces. A plurality of bearing rollers 17 are provided in the holes through the plate which receive the shafts 16. These rollers have a length slightly less than the thickness of the plate, which thickness is, of course, proportioned to carry the bearing load.

Washers 18 having an outside diameter greater than the holes in the plate for the bearings, are disposed on the shafts 16 between the plate 13 and the beams 10 and 11. The washers preferably have a press fit on the shafts or are otherwise secured thereto. They serve to retain the rollers 17 in place within the holes in the plate 13 and also to keep the shafts approximately centered relative to the plate. If desired, additional washers 19 may be placed on the shafts externally of the beams and held in place by cotter pins 20, thus positively centering the trolley between the beams and maintaining clearance between the washers 18 and beams.

It will be evident that the construction described provides a freely movable suspension for pipe or other members. In the construction shown, the suspension is free to move longitudinally of the pipe. This is sufficient for many pipe supports where lateral restraint is permissible or desired.

In certain instances it is desired that the suspension be free to move in two directions. A construction suited for such applications is illustrated in Figure 3. As there shown, I employ two trolleys indicated generally at 21 and 22 similar to that shown in Figures 1 and 2 and described above. The trolleys 21 and 22 support a pair of beams 23 similar to those shown at 10 and 11 welded to the plates 13 thereof. The beams 23 are also similar to those shown at 10 and 11 and support a plate 24 by means of shafts 25 similar to those shown at 16. A pipe hanger 26 of any desired type is welded to the plate 24.

It will be apparent that the hanger 26 is free to move along the beams 23 on rotation of the shafts 25. Similarly, the entire trolley comprising the beams 23, plate 24 and shafts 25 is movable along the beams of the trolleys 21 and 22 on rotation of their shafts. The suspended member is thus free to move in any direction in a horizontal plane.

Figure 4 illustrates a modification which is generally similar to the construction shown in Figures 1 and 2 except that the track members 27 are formed by slotting the web of a channel 28. It will be evident that a pair of angles could be used instead. This construction has the advantage that the upstanding flanges of the beams further confine the shafts against longitudinal displacement so that washers 19 and cotters 20 are not required.

Instead of forming slots in the flanges of angles as shown in Figures 1 and 2, upper surfaces of the horizontal flanges of the angles may serve as tracks.

It will be apparent from the foregoing description that the invention provides a simple trolley which can be made at low cost and is adaptable to a variety of applications with little or no change. The supporting beams may be mounted in any convenient manner and the hanger readily attached to the pipe or other suspended member by welding. The entire assembly is very compact and requires but little head room. This is an important factor in all pipe-line installations. The trolleys and track members may readily be combined into units completely assembled at the factory providing the desired degree of freedom of movement. The only installation work required is the mounting of the supporting beams and securing the hanger plate to the pipe. The complete suspension and the individual parts are very rugged even when made of small dimensions because of the compact arrangement and the fact that all stresses involved are applied directly to the members intended to sustain them.

Although I have illustrated and described but a preferred embodiment and certain modifications of the invention, it will be recognized that changes in the construction disclosed may be made without departing from the spirit of the invention or the scope of the appended claims.

I claim:

1. A suspension trolley comprising a hanger plate depending between spaced parallel track members, said plate having holes therethrough at points spaced along said members, shafts extending through said holes with their ends resting on the track members for rolling movement, and antifriction bearings in said holes, said shafts being journaled in said bearings, respectively.

2. A suspension trolley comprising a pair of spaced parallel beams having track surfaces thereon, a hanger plate depending between said beams and adapted to be secured to a member to be supported, holes in said plate spaced along said beams, anti-friction bearings in said holes and shafts journaled in said bearings, respectively, said shafts extending outwardly from the plate, the outwardly extending portions of the shafts engaging said track surfaces for rolling movement thereon.

3. A suspension trolley comprising a pair of spaced parallel beams having track surfaces thereon, a hanger plate depending between said beams and adapted to be secured to a member to be supported, holes in said plate spaced along said beams and bearing rollers spaced circumferentially of said holes, shafts extending through said hole and journaled on said rollers, the ends of the shafts resting on said track surfaces, means on the shafts between the plate and said beams adapted to retain the rollers in place, and means for limiting longitudinal shifting of the shafts.

4. The apparatus defined by claim 2 characterized by washers on said shafts between said plate and said beams for retaining said bearings in position.

5. A suspension trolley for pipe hangers or the like having limited freedom of movement to compensate for thermally caused changes in position, comprising in combination, at least a pair of spaced parallel substantially horizontal beams, said beams having laterally registering track surfaces formed thereon along a portion of the length thereof, a dependent pipe hanger plate positioned between said beams adjacent said track surfaces, said hanger plate having holes therethrough along the length of said track surfaces and in registry therewith, a laterally extending shaft journaled in bearings in each of said holes intermediate the ends of said shaft, said shafts extending outwardly a sufficient distance to engage said track surfaces for rolling movement thereon, and means for preventing axial movement of said shafts and said bearings in excess of normal play relative said hanger plate and said track surfaces.

EDWIN A. WERT.

REFERENCES CITED

The following references are of record in the file of this patent:

UNITED STATES PATENTS

| Number | Name | Date |
|---|---|---|
| 626,276 | Goldie | June 6, 1899 |
| 2,156,468 | Wood | May 2, 1939 |
| 2,191,071 | Duttera | Feb. 20, 1940 |
| 2,256,784 | Wood | Sept. 23, 1941 |
| 2,305,048 | Wert | Dec. 15, 1942 |